United States Patent [19]

Shnaid

[11] Patent Number: 5,442,904
[45] Date of Patent: Aug. 22, 1995

[54] GAS TURBINE WITH BOTTOMING AIR TURBINE CYCLE

[76] Inventor: Isaac Shnaid, Zalman Shneuz Stz. 36/10, Haifa 32545, Israel

[21] Appl. No.: 210,570

[22] Filed: Mar. 21, 1994

[51] Int. Cl.[6] .............................................. F02C 6/18
[52] U.S. Cl. .............................. 60/39.02; 60/37.183
[58] Field of Search ............ 60/39.181, 39.183, 39.511, 60/726, 728, 39.02

[56] References Cited

U.S. PATENT DOCUMENTS

| | | | |
|---|---|---|---|
| 2,485,023 | 10/1949 | Traupel | 60/39.183 |
| 2,651,174 | 9/1953 | Bolsezian | 60/39.183 |
| 2,658,336 | 11/1953 | Traupel | 60/39.183 |
| 4,751,814 | 6/1988 | Farrell | 60/39.183 |
| 4,785,621 | 11/1988 | Alderson et al. | 60/39.183 |

Primary Examiner—Louis J. Casaregola

[57] ABSTRACT

Gas turbine with a bottoming air turbine cycle. This system comprises a gas turbine and a bottoming air turbine cycle system. The latter includes a gas-to-air heat exchanger, compressed air aftercooler, an air compressor, a hot air turbine, and a cold air turbine. High temperature exhaust gases of the gas turbine pass the heat exchanger heating compressed air delivered by the air compressor. Then hot air expands in the hot air turbine. Part of the air from the compressor is cooled in the aftercooler, and then expands in the cold air turbine. Hot and cold air turbines drive the air compressor and an electric generator or other consumer of mechanic power. After the cold air turbine, air temperature is lower than the ambient temperature. Using it, refrigeration can be provided, including cooling gas turbine compressor inlet air. In this mode, the gas turbine compressor consumes air having stabilized low temperature and stabilized pressure. A special peak load mode of the gas turbine is also available.

11 Claims, 5 Drawing Sheets

GAS TURBINE WITH BOTTOMING AIR TURBINE CYCLE

FIELD OF THE INVENTION

This invention relates to gas turbine systems that produce shaft mechanic power using combustion of fuel. More particularly, this invention relates to gas turbine systems with waste heat utilization for additional shaft mechanic power production. Described in the invention the Bottoming Air Air Turbine Cycle Subsystem may be applied also for other types of gas cycle engines, e.g. internal combustion engines and closed cycle gas turbines.

BACKGROUND OF THE INVENTION

Modern simple cycle gas turbines have thermal efficiency of 33-37%, but much better utilization of fuel availability is possible, because their exhaust gases have a high temperature exceeding 500° C. Thermodynamic calculations prove that, by using exhaust gases temperature potential, power output and thermal efficiency of power systems with gas turbines may be doubled in the ideal, theoretical case. Practically, gas turbine waste heat is utilized for power production in a bottoming Rankine cycle engine usually using water as a working fluid (see, H. Cohen, G. F. C. Rogers, and H. I. H. Saravanamuttoo, "Gas Turbine Theory", 3rd edition, Longman, Harlow, UK, 1987; and J. H. Horlock, "Combined Power Plants", Pergamon Press, Oxford-New York-Seoul-Tokyo, 1992). Combined cycle plants employing gas turbine and Rankine bottoming cycle steam engine are widely applied in energetics ensuring high thermal efficiency and moderate capital cost of the power system. Bottoming Rankine cycle steam engine is a complicated closed cycle system with high pressure in a boiler and vacuum in a condenser. This engine is quite similar to base load power steam plants applied in energetics. It includes machine equipment (steam turbines, high pressure feedwater pumps and vacuum pumps); several heat exchangers ensuring heat transfer from gas turbine exhaust gases to the boiling high pressure water and steam, and heat transfer from low pressure steam to ambient (boilers, condenser, steam and water heaters), water treatment system that ensures conditioning of the working fluid, cooling water system or cooling air system etc. Since an average specific capital cost of a gas turbine is 350 $/kW only, capital cost of the bottoming Rankine cycle equipment is 1,000–1,200 $ for 1 kW of the bottoming cycle capacity, that is high enough and is close to numbers valid for base load steam plants (see, H. G. Stoll and others, "Least-Cost Electric Utility Planning", John Wiley & Sons, New York, 1989).

The bottoming Rankine cycle steam engine cannot ensure quick response on a load change. It means, that combined cycle plant may be applied for base load only.

Gas turbine power output and thermal efficiency drop when density of inlet air decreases. Therefore increasing atmospheric air temperature and decreasing its pressure lead to degradation of gas turbine characteristics. To avoid this, various methods of cooling air, entering gas turbine compressor, are proposed. They apply evaporative cooling or separate refrigerating machines that may be combined with an accumulator of cold (see, H. Shreiber, "Using Ice Storage to Enhance Gas Turbine Capacity", EPRI Journal, October-November 1991; H. Jericha, F. Höller, "Modular Combined Cycle Plant Enhanced for More Efficiency, Power and Maintainability", 1991 ASME COGEN-TURBO IGTI, v. 6, pp. 403–410; and "Inlet Cooling at 100° F. and Higher", Gas Turbine World, May–June 1993).

Evaporative cooling of inlet air is not efficient and can be used only when atmospheric air humidity is low. Refrigerating machines ensure deep cooling of inlet air, but these devices are separate units that consume electric power from the grid and are simply added to existing gas turbine equipment. Complexity of refrigerating machines, their environmental impact, high capital and operational costs are additional factors that should be taken into account. Refrigerating machinery is a source of additional problems in operation and maintenance of gas turbine power system.

SUMMARY OF THE INVENTION

It is an object of our invention to provide a new shaft power system and a new method of mechanic power production.

In accordance with this invention, there is introduced a new shaft power system—Gas Turbine With Bottoming Air Turbine Cycle comprising:

Gas Turbine Subsystem comprising connected in series a main air compressor with air intercoolers or without them, one or more combustors and turbines, wherein compressor suction duct is connected to the atmosphere through inlet line with a valve, and also to additional inlet lines with valves;

Main Heat Exchanger comprising one or more sections whose gas sides are connected in series one with another and with exhaust duct of one of said turbines, and whose air sides are separated one from another;

Bottoming Air Turbine Cycle Subsystem comprising an additional multistage air compressor with air intercoolers or without them, an aftercooler, a multistage hot air turbine, a cold air turbine, and circuits connecting exhaust lines of certain stages of said additional air compressor with inlet lines of certain stages of said hot air turbine, wherein in every said circuit is inserted air side of certain section of said Main Heat Exchanger, said cold air turbine is connected in series through said aftercooler and control valve with certain stage of said additional air compressor, exhaust duct of certain stage of said additional air compressor is connected to said additional inlet line of said main air compressor, and exhaust duct of said cold air turbine is connected with another said additional inlet line of said main air compressor and, through a line with a valve, to external consumers of cold air.

High temperature exhaust gases of gas turbine pass Main Heat Exchanger heating compressed air delivered by compressor of the bottoming air turbine system. Then air is expanded in hot air turbine producing mechanic power. Part of compressed air after certain stage of compressor passes aftercooler. Then cooled compressed air is expanded in cold air turbine producing mechanic power, and its temperature becomes lower than the ambient. Hot and cold air turbines drive air compressor and electric generator or other consumer of mechanic power.

Various modifications and operational modes of the system are possible. In one of them, the bottoming air turbine system only produces additional mechanic power using heat extracted from gas turbine exhaust gases. In this case, only air compressor and hot air turbine are activated. Peak load regime is available when gas turbine compressor is fed by compressed air from the bottoming cycle air compressor. In another mode, refrigeration is also provided since cold air turbine is activated in addition to hot air turbine and air compressor.

Systems with simple and multistage bottoming air turbine cycles and various machine arrangements are introduced.

In the refrigeration mode of the bottoming air turbine cycle system, refrigeration of various substances, materials and devices is provided, including cooling air supplied to the gas turbine compressor.

This cooling is produced as a result of mixing exhaust air of cold air turbine with atmospheric air entering gas turbine compressor. Therefore low temperature of inlet air in a gas turbine may be achieved. Cooling inlet air increases its density and, respectively, air mass flow rate thus substantially increasing gas turbine power output and efficiency. Now temperature of air, entering gas turbine, may be stabilized on a low level. Also it is possible to supply the gas turbine compressor by air having not only stabilized low temperature, but stabilized pressure. In this case, suction line of the gas turbine compressor is straightly connected only with exhaust line of cold air turbine and not with the atmosphere. This ensures full control of inlet air temperature and pressure, so that gas turbine power output and efficiency become independent from atmospheric pressure and temperature, remaining high for any ambient conditions.

Accordingly several other objects and advantages of Gas Turbine With Bottoming Air Turbine Cycle are as follows:

1. It applies atmospheric air as a working fluid, and therefore does not need any systems and devices that serve for conditioning the working fluid. This simplifies the system, its operation and maintenance, decreasing its capital cost and operational expenses.
2. In the bottoming air turbine cycle, approximate values of maximal air pressure and temperature are 4 bar and 500° C., respectively. For such low air pressure and temperature, efficient, simple, light and nonexpensive air compressors, air turbines and heat exchangers may be applied. This leads to high efficiency of the system, its low capital cost and high reliability. This system may have not only industrial but also transport applications on cargo vessels, ferries etc.
3. Exhaust air temperature for the hot air turbine exceeds 300° C. This air can be used in technological processes that need very hot, clean and dry air. In all other cases, exhaust duct of the hot air turbine is connected with the atmosphere, so that there is no need to introduce special heat exchanger for rejecting heat from working fluid to surroundings.
4. Heat inertia of the bottoming air cycle system is small, and fast response on load changes may be achieved. Gas Turbine With Bottoming Air Turbine Cycle may be applied as a peak load and a base load plant, and on the transport.
5. Refrigerating system is an integral part of the Bottoming Air Turbine Cycle System, it consumes only mechanic power produced from gas turbine waste heat and does not need electric power. Gas turbine inlet air deep cooling is provided without special refrigerants, air pollution and other environmental impact. Only one heat exchanger and a cold air turbine are employed in the refrigerating part of the Bottoming Air Turbine Cycle System.
6. Because air is used as a working fluid in the bottoming cycle, integration of bottoming cycle machine system with gas turbine machine system becomes possible. In this case, the same air compressor supplies compressed air for the gas turbine and for the air expanders of the bottoming cycle. Hot and cold air turbines could be installed on the common shaft with gas turbine compressor and expander.
7. The Bottoming Air Turbine Cycle System may be applied not only for gas turbines, but also for other types of gas cycle engines including internal combustion engines and closed cycle gas turbines ensuring improvement of their techno-economic characteristics.

In accordance with this invention, there is provided a new method of mechanic power production comprising the following steps:
  compressing the first air flow;
  heating this air flow;
  expanding this air flow with deriving the work;
  extracting heat from this air flow;
  compressing the second air flow;
  heating this air flow by the heat extracted from the first air flow;
  expanding the second air flow with deriving the work;
  compressing the third air flow using work derived while expanding took place;
  extracting heat and condensed water from this air flow;
  expanding this air flow with deriving the work.

Several useful modifications of this method are also introduced.

The invention will be now illustrated in the following description with occasional reference to the annexed drawings.

DETAILED DESCRIPTION OF THE INVENTION

For full understanding the principles and features of this invention, now reference will be made to the embodiments illustrated by drawings. Nevertheless, it should be understood that no excess limitations are not thereby introduced.

Figure 1:
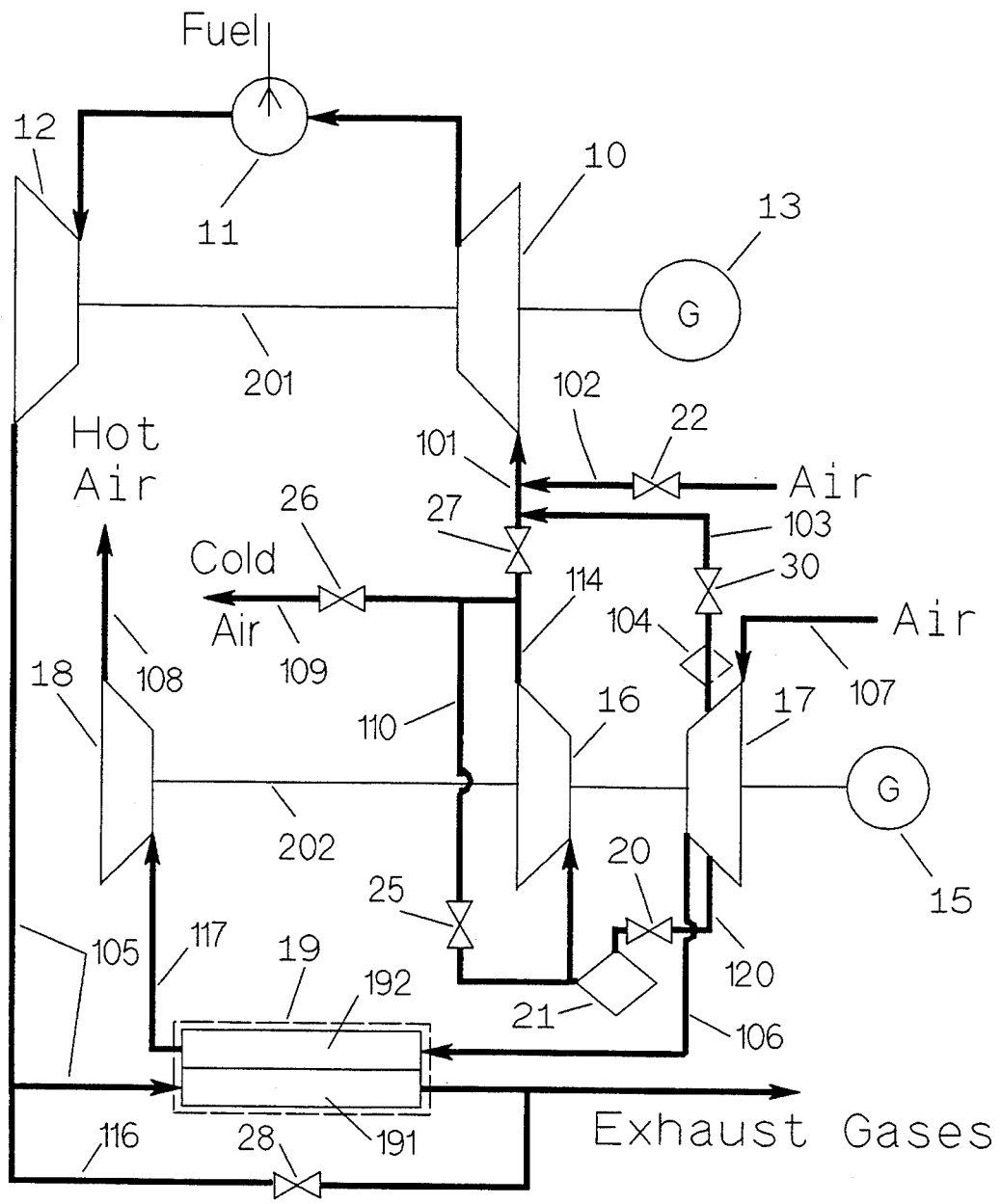
FIG. 1 is a schematic diagram of a gas turbine with a simple bottoming air turbine cycle.

Referring to FIG. 1, a preferred embodiment of a gas turbine with a simple bottoming air turbine cycle is schematically shown. This power system includes three subsystems:
1. Gas Turbine Subsystem.
2. Main Heat Exchanger.
3. Bottoming Air Turbine Cycle Subsystem.

Gas Turbine Subsystem comprises connected in series main air compressor 10, combustor 11 and turbine 12. Compressor suction duct 101 is connected through a line 102 with a valve 22 to the atmosphere, through a line 114 with a valve 27 to a cold air turbine 16, and through a line 103 with a valve 30 with a certain stage of additional air compressor 17. An auxiliary aftercooler 104 of any type, cooled by water or atmospheric air, may be installed in series with the valve 30. Exhaust line 105 of the turbine 12 is connected with the Main Heat Exchanger 19. Compressor 10 and turbine 12 have a common shaft 201 connecting them with consumer of shaft mechanic power and with a starter device, that are schematically shown as an element 13. In a particular case it can be an electric motor-generator.

Compressor 10, combustor 11 and turbine 12 may be of any type known in the art. Compressor may use air intercoolers. In the Gas Turbine Subsystem, plurality of turbines and combustors may be also applied. Instead of turbines, may be used expanding devices of any other type known in the art that ensure expansion of gaseous substances with shaft mechanic power production.

Valves 22 and 27 are flow controlling devices of any type known in the art.

Main Heat Exchanger 19 may be of any type known in the art. Its gas side 191 is connected in series with exhaust line 105 of turbine 12, and its air side is connected in series with exhaust duct 106 of compressor 17. Outlet duct 117 of the heat exchanger air side 192 is connected to hot air turbine 18. Heat exchanger gas side 191 has a bypass line 116 with a valve 28.

Bottoming Air Turbine Cycle Subsystem comprises additional multistage compressor 17, hot air turbine 18 and cold air turbine 16. They have a common shaft 202 connecting them with a consumer of shaft mechanic power and with a starter device, that are schematically shown as an element 15. In a particular case, it can be an electric motor-generator. Suction duct 107 of compressor 17 is connected with the atmosphere. Exhaust duct 108 of hot air turbine is connected with the atmosphere or with external consumers of hot air not shown on drawings. Cold air turbine 16 is connected to the certain stage of compressor 17 through an aftercooler 21, a flow controlling device-valve 20 and the line 120. Besides the valve 27, exhaust duct 114 of cold air turbine 16 is connected through a valve 26 and the line 109 with external consumers of cold air not shown on the drawings. Cold air turbine has a bypass line 110 with a valve 25.

Additional compressor 17, hot air turbine 18 and cold air turbine 16 are of any type known in the art. Compressor 17 may use air intercoolers. Instead of turbines 16 and 18, may be used expanding device of any other type known in the art that ensures expansion of gaseous substances with simultaneous shaft mechanic power production. While humid air is expanding in the cold air turbine, water vapour is condensing creating initially water drops, and then, at low air temperature, ice particles appear. The design of cold air turbine must ensure turbine high efficiency and reliability at maximal water or ice content of approximately 0.025 kg per 1 kg of dry air. Instead of one compressor 17, three separate compressors on the common shaft can be used: the first for feeding the gas turbine air compressor, the second for activation of the hot air turbine, and the third for activation of the cold air turbine.

Aftercooler 21 is a heat exchanger of any type known in the art together with a water separator. In an element 21, compressed air is cooled by any heat sink from surroundings, e.g. water or atmospheric air, condensed water is extracted from compressed air after its cooling.

The power system of FIG. 1 has five operational modes:
Mode No. 1. Shaft mechanic power production only.
Mode No. 2. Shaft mechanic power production only. Peak load output.
Mode No. 3. Shaft mechanic power and cold production.
Mode No. 4. Shaft mechanic power and cold production with simultaneous cooling gas turbine inlet air.
Mode No. 5. Shaft mechanic power production by gas turbine only.

In the Mode No. 1, valves 20, 26, 27, 28 and 30 are closed, valves 22 and 25 are opened. Atmospheric air is compressed in compressor 10 and enters combustor 11. Fuel is supplied to combustor 11 and is burned in it. High temperature gases leaving combustor enter turbine 12. Here expansion with shaft mechanic power production takes place. Turbine 12 drives compressor 10 and electric generator or another consumer of shaft mechanic power 13. Exhaust gases of turbine 12 pass heat exchanger 19 and leave system. Atmospheric air is compressed in compressor 17 and enters heat exchanger 19 where air is preheated by heat extracted from hot exhaust gases. Then hot air is expanding in hot air turbine 18 producing shaft mechanic power. Exhaust air temperature for a hot air turbine exceeds 300° C. This air can be used in technological processes that need very hot, clean and dry air. Turbine 18 drives compressor 17 and electric generator or another consumer of shaft mechanic power 15. So the Bottoming Air Turbine Cycle Subsystem produces hot air and shaft mechanic power in addition to mechanic power produced by gas turbine. Because bypass valve 25 is opened, dissipation of mechanic energy caused by rotation of cold air turbine 16 is minimal.

In the Mode No. 2, valves 20, 22, 26, 27 and 28 are closed, valves 25 and 30 are opened. Processes in the system are the same as in the Mode No. 1, but now air pressure in the gas turbine compressor inlet duct 101 is higher than atmospheric pressure, because gas turbine compressor 10 is connected in series with a certain stage of compressor 17 driven by hot air turbine 18. Therefore air mass flow rate and power output in the Gas Turbine Subsystem become higher than in the Mode No. 1. This mode of operation may be applied when peak load occurs and drastic increase of power output is demanded, or when gas turbine is located on a mountain site with low atmospheric pressure.

In the Mode No. 3, valves 25, 27, 28 and 30 are closed, valves 20, 22 and 26 are opened. Atmospheric air is compressed in compressor 10 and enters combustor 11. Fuel is supplied to combustor 11 and is burned in it. High temperature gases leaving combustor enter turbine 12. Here expansion with shaft mechanic power production takes place. Turbine 12 drives compressor 10 and electric generator or another consumer of shaft mechanic power 13. Exhaust gases of turbine 12 pass heat exchanger 19 and leave system. Atmospheric air is compressed in compressor 17 and enters heat exchanger 19 where air is preheated by heat extracted from hot exhaust gases. Then hot air is expanded in hot air turbine 18 producing shaft mechanic power. Turbine 18 drives compressor 17 and electric generator or another consumer of shaft mechanic power 15. Compressed air from certain stage of compressor 17 passes aftercooler 104, then air is expanded in the turbine 16 producing mechanic power, and its temperature becomes lower than ambient. The valve 20 controls cold air temperature. Cold air is supplied through the valve 26 to external consumers of cold. So the Bottoming Air Turbine Cycle Subsystem produces cold and hot air, and shaft mechanic power in addition to mechanic power produced by Gas Turbine Subsystem.

In the Mode No. 4, valves 25, 28 and 30 are closed, valves 20, 22, 26 and 27 are opened. The processes in the system are the same as in the Mode No. 3, and the Bottoming Air Turbine Cycle Subsystem produces cold and hot air, and shaft mechanic power in addition to mechanic power produced by Gas Turbine Subsystem. But now one part of the cold air is supplied through the valve 26 to external consumers of cold, another part of cold air is supplied through the valve 27 to the inlet duct 101 of the gas turbine compressor 10 and is mixed with atmospheric air that passes valve 22 lowering temperature of inlet air in the Gas Turbine Subsystem. Valves 22 and 27 control this temperature. In this mode, gas turbine inlet air temperature can be stabilized on the optimal low level that ensures high overall power output and efficiency of the system at any high temperature of atmospheric air. Gas turbine inlet pressure can be also stabilized on the optimal high level when the valve 22 is closed, and compressor 10 is fed by exhaust air of the cold air turbine 16 only. The latter operational regime is preferable when gas turbine is located on a mountain site having low atmospheric pressure, or when a peak load demand occurs.

In the Mode No. 5, valves 22 and 28 are opened, all other valves are closed. Fuel is supplied to combustor 11, and only Gas Turbine Subsystem produces shaft mechanic power, while the bottoming cycle machinery is not active.

Figure 2:
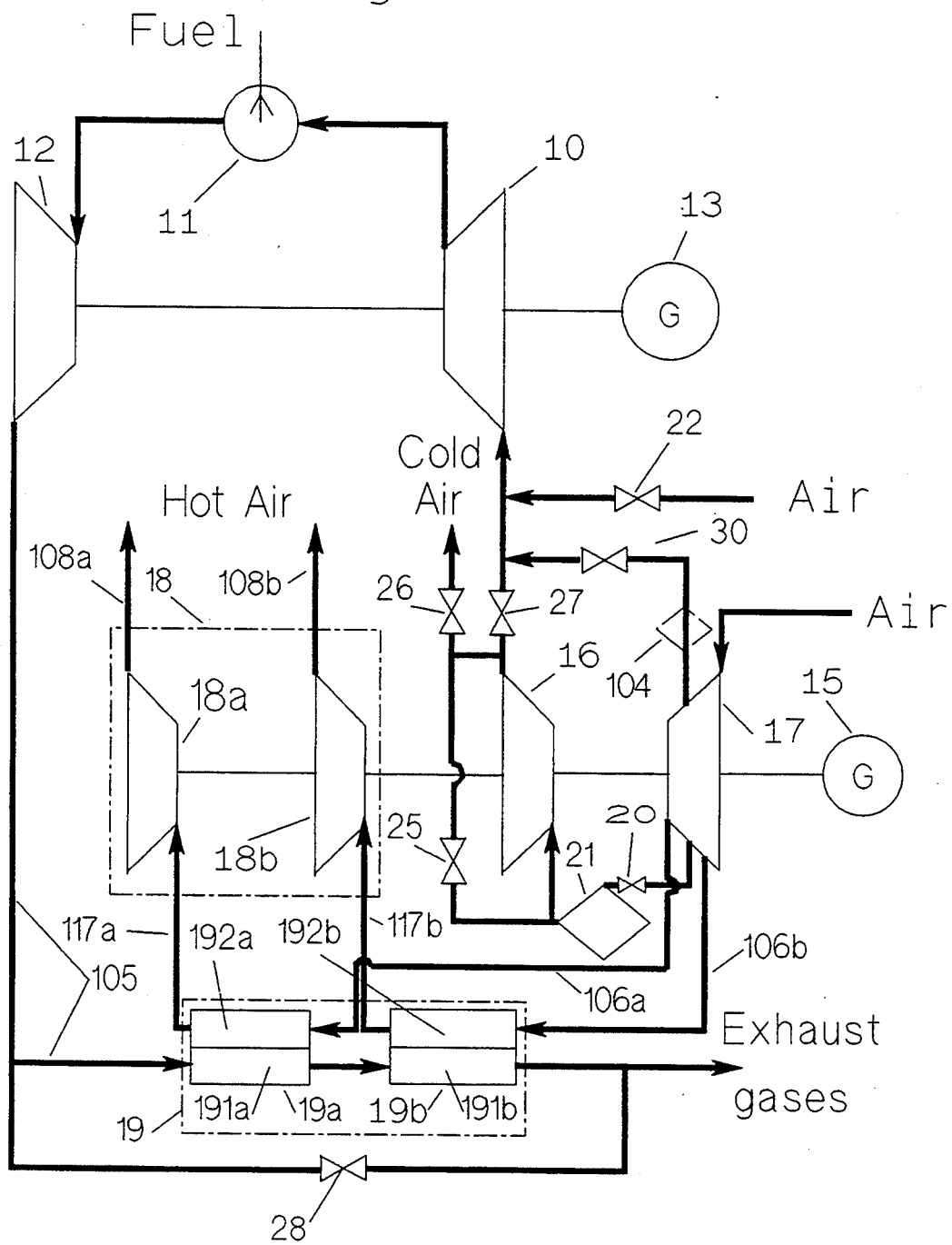
FIG. 2 is a schematic diagram of a gas turbine with two stage bottoming air turbine cycle.

Referring to FIG. 2, a preferred embodiment of gas turbine with two stage bottoming air turbine cycle is schematically shown. In this case, Gas Turbine Subsystem remains the same as in the previous system shown on FIG. 1. The Main Heat Exchanger 19 has two sections 19a and 19b whose gas sides 191a and 191b are connected in series, so that the first section 19a has higher temperature than the second section 19b. The hot air turbine 18 comprises two turbine stages 18a and 18b. Air side 192a of the section 19a is inserted in the circuit connecting the last stage of additional air compressor 17 and hot air turbine stage 18a by lines 106a and 117a. Air side 192b of the section 19b is inserted in the circuit connecting the intermediate stage of air compressor 17 and hot air turbine stage 18a by lines 106b and 117b. Instead of one multistage compressor 17, several separate compressors having a common shaft can be applied. All other elements of the Bottoming Air Turbine Cycle Subsystem are the same as on FIG. 1.

The power system of FIG. 2 has the same five operational modes as the power system of FIG. 1 with the same valve positions. Only operation of the Bottoming Air Turbine Cycle Subsystem differs from previously described. Compressed air from the last stage of compressor 17 is heated in heat exchanger section 19a to the highest temperature and then is expanded in hot air turbine stage 18a producing shaft mechanic power, while air from the intermediate stage of compressor 17 is heated in heat exchanger section 19b to lower temperature and is expanded in hot air turbine stage 18b. This scheme ensures better utilization of exergy of gas turbine exhaust gases because now more heat is extracted from them and more mechanic shaft power is produced by hot air turbine.

Further increase of power output may be achieved in a bottoming air turbine cycle having more than two stages. Comparing FIGS. 1 and 2 shows that for a multistage bottoming cycle, the Main Heat Exchanger comprises several sections whose gas sides are connected in series, the Bottoming Air Turbine Cycle Subsystem comprises plurality of separate air compressors, that can be united in one multistage compressor, and a hot air turbine comprises plurality of turbine stages. Compressors suction lines are connected with atmosphere. Air side of every section of the Main Heat Exchanger is inserted in a circuit connecting exhaust line of the certain compressor with an inlet line of the corresponding hot air turbine stage, and characteristics of air compressors and of hot air turbine stages are chosen in such way that higher air pressure is maintained in sections of the Main Heat Exchanger where an average temperature of exhaust gases is higher.

Figure 3:
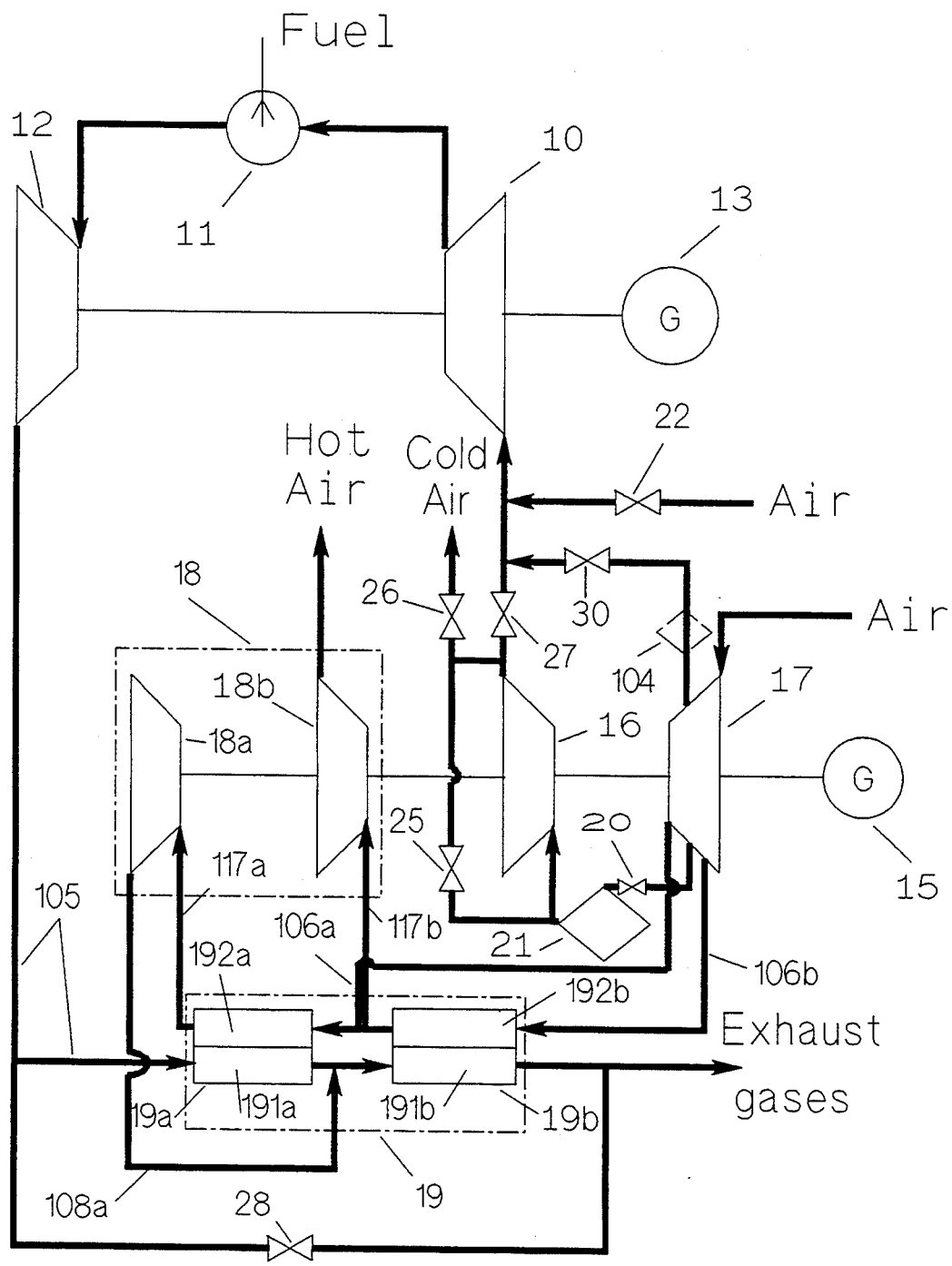
FIG. 3 is a schematic diagram illustrating an useful modification of a system of FIG. 2.

Usually exhaust air of the hot air turbine stage 18a from FIG. 2 is hot enough to be used for additional production of mechanic power, and temperature of this air is almost the same as temperature of exhaust gases leaving section 19a of Main Heat Exchanger. Therefore, as shown on FIG. 3, exhaust air of hot air turbine stage 18a can be mixed with exhaust gases leaving heat exchanger section 19a, and resulting flow passes the next Main Heat Exchanger section 19b. Now mass flow rate of compressed air in section 19b may be increased, and more mechanic power will be produced by the turbine stage 18b. As it can be seen from FIG. 3, increasing power output of the system by using the exergy of exhaust hot air is achieved, if exhaust air of any hot air turbine stage is mixed with exhaust gases leaving the section of Main Heat Exchanger whose air side belongs to the circuit including the said hot air turbine stage.

Figure 4:
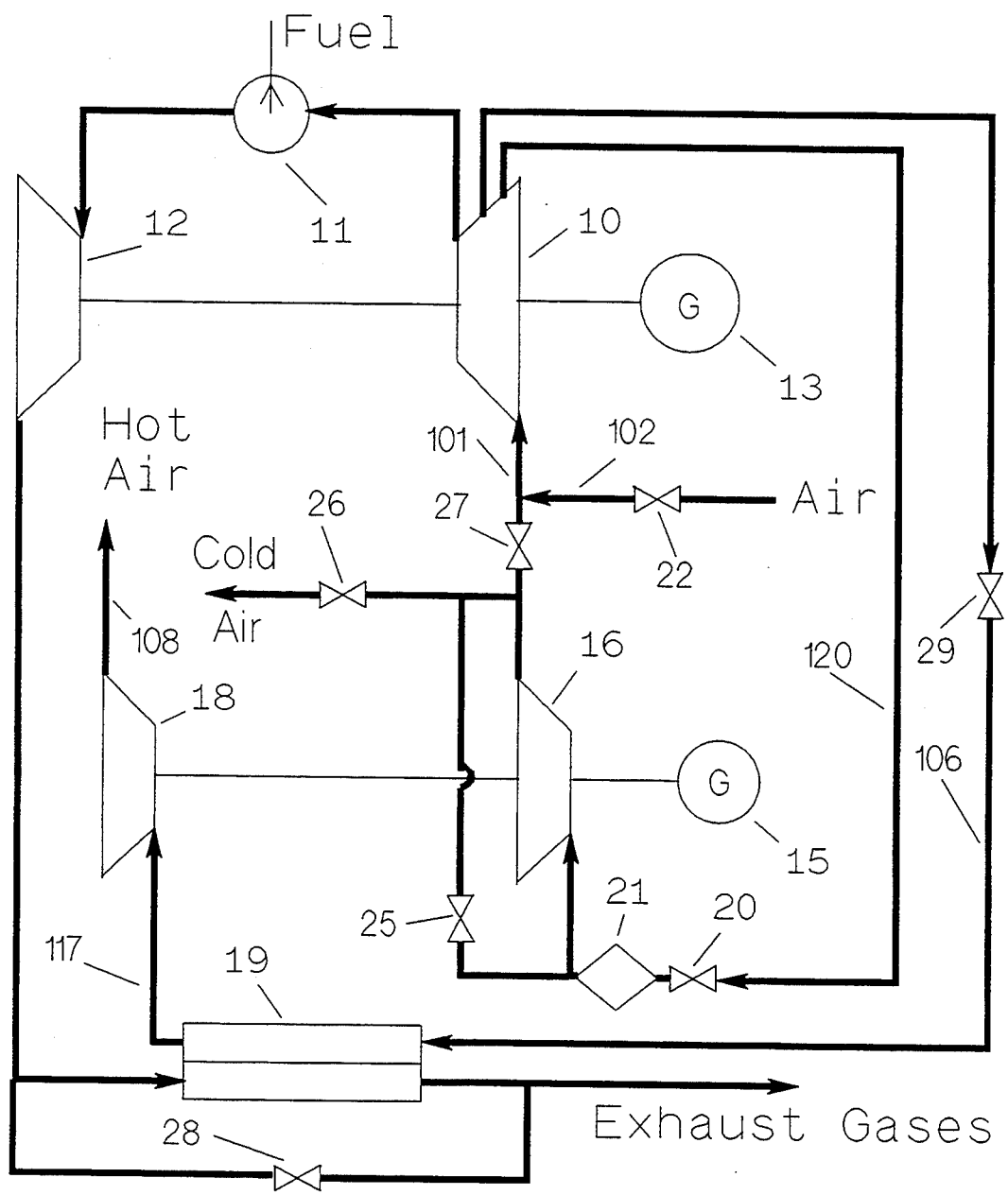
FIG. 4 is a schematic diagram of a system employing the same compressor for the gas turbine and for the bottoming cycle subsystems.

Referring to FIG. 4, the preferred embodiment of the power system employing the same multistage air compressor for Gas Turbine Subsystem and for Bottoming Air Turbine Cycle Subsystem is schematically shown. Thermodynamically, this system is equivalent to the system shown on FIG. 1, and the same elements on both drawings have the same numbers. On FIG. 4, the last stage of air compressor 10 is connected to combustor 11, and intermediate stages of this compressor supply compressed air to hot air turbine 18 and cold air turbine 16. This system has the same five operational modes as the system of FIG. 1. In the Mode No. 5, valves 22 and 28 are opened, all other valves are closed. Multistage systems shown on FIGS. 2 and 3 can also apply one multistage air compressor for Gas Turbine Subsystem and for Air Turbine Cycle Subsystem.

Figure 5:
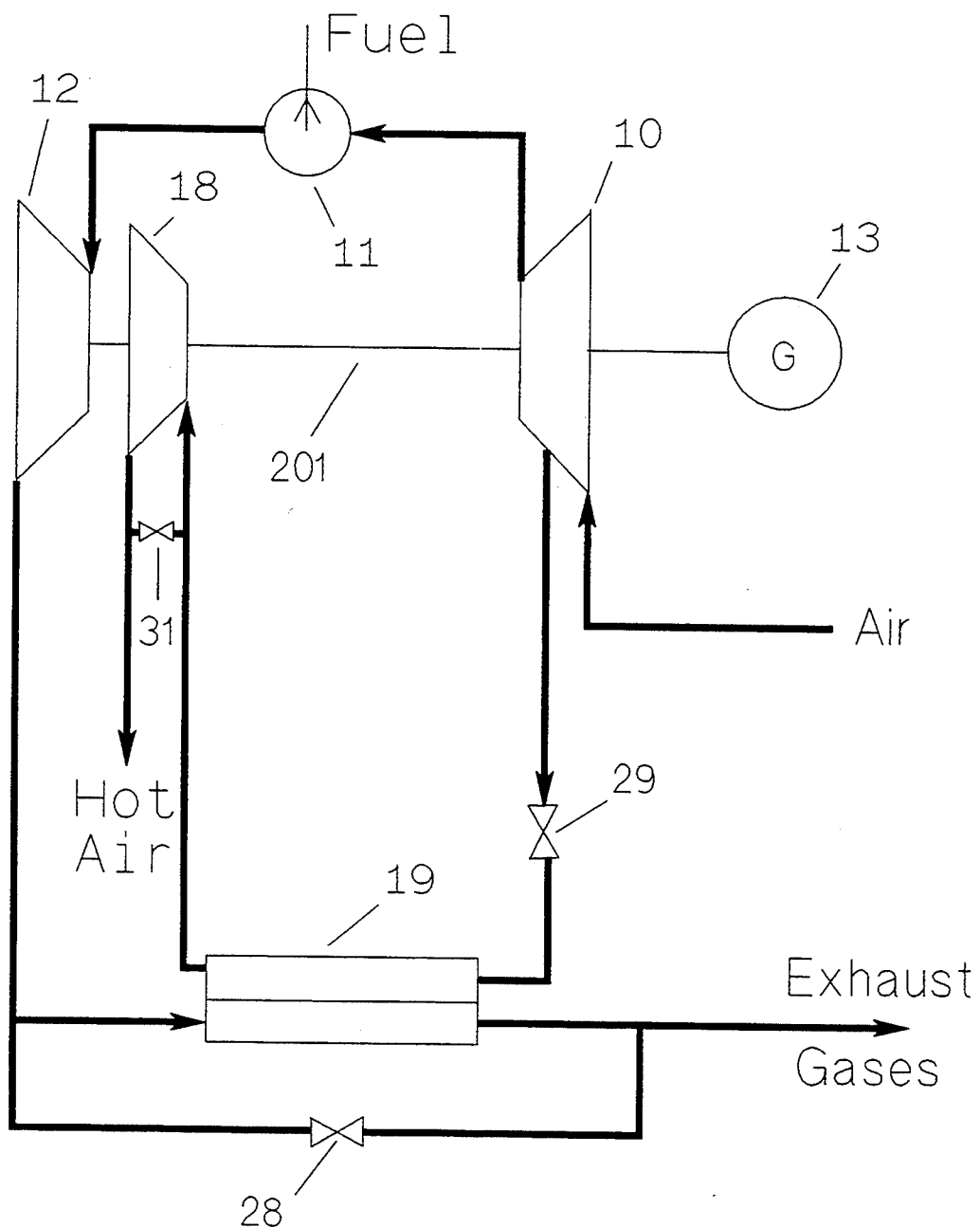
FIG. 5 is a schematic diagram of a gas turbine fully integrated with the bottoming air turbine cycle subsystem.

Further integration of Gas Turbine Subsystem and of Bottoming Air Turbine Cycle Subsystem, when compressor and all turbines have a common shaft, is schematically shown on FIG. 5. In this case, all elements of both subsystems may be united in one package. Here hot air turbine 18, turbine 12 and compressor 10 have a common shaft 201. Bypass valve 31 is opened in the Mode No. 5 only, reducing dissipation of mechanic energy caused by rotation of the hot air turbine rotor. In the same way rotor of cold air turbine may be installed on the common shaft 201.

As an example, will be considered characteristics of a power system comprising a gas turbine having electric power output of 225.5 MW and thermal efficiency of 0.357 at air temperature 15° C. and sea level conditions. Using heat extracted from exhaust gases, a two-stage bottoming air turbine cycle produces 58.9 MW of shaft power when refrigeration is not provided. So overall power output of 284.4 MW and thermal efficiency of 0.450 are achieved. At high ambient temperature of 45° C., gas turbine output and efficiency drop to 177.2 MW and 0.339, respectively. For this ambient temperature, overall power output becomes 286.1 MW with overall thermal efficiency of 0.390, if two-stage bottoming air turbine cycle with a cold air turbine is applied, ensuring gas turbine inlet air temperature of −15° C. For the same ambient conditions and the same two-stage bottoming cycle but without refrigeration, total power output of 217.9 MW and thermal efficiency of 0.417 are attainable.

These data prove that described new power system has high power output and efficiency in a wide range of ambient temperatures. In addition, this system ensures peak load operation with high power output, stabilized gas turbine inlet air pressure and refrigeration of various substances, materials and devices by cold air. The introduced Bottoming Air Turbine Cycle Subsystem uses atmospheric air as a working fluid, does not need any systems and devices that serve for conditioning the working fluid, is simple enough, and applies low pressure air compressors, air turbines with low inlet temperature, and nonexpensive heat exchanger. In the bottoming air turbine cycle, exhaust air is hot, clean and dry, and may be used for heating and drying. Because of low heat inertia, Gas Turbine With Bottoming Air Turbine Cycle ensures fast response on load changes. Refrigerating system is an integral part of the Bottoming Air Turbine Cycle Subsystem, and provides deep cooling of gas turbine inlet air without special refrigerants, air pollution and other environmental impact. Full integration of bottoming cycle machine system with gas turbine machine system is possible.

The Bottoming Air Turbine Cycle Subsystem may be applied not only for gas turbines, but also for other types of gas cycle engines, including internal combustion engines and closed cycle gas turbines, ensuring improvement of their techno-economic characteristics. As it may be seen from FIGS. 1, 2 and 3 and from corresponding text, this invention employs a new method of mechanic power production comprising the following steps: compressing the first air flow; heating this air flow; expanding this air flow with deriving the work; extracting heat from this air flow; compressing the second air flow; heating this air flow by the heat extracted from the first air flow; expanding the second air flow with deriving the work; compressing the third air flow using work derived while expanding took place; extracting heat and condensed water from this air flow; expanding this air flow with deriving the work.

This invention also employs three useful modifications of the method.

In the first modification of the method, there is provided an additional heating of the second air flow by heat extracted from this air flow after its expanding;

In the second modification of the method, the third air flow after expanding extracts heat from the first air flow before its compressing.

In the third modification of the method, an additional compressing of the first air flow is applied using the work derived while the expanding the second and the third air flows took place.

As will no doubt be clear to those skilled in the art, the embodiments specifically described herein in the above text and in the annexed drawings, are exemplary, and should not be construed as limiting.

I claim:

1. Gas Turbine With Bottoming Air Turbine Cycle comprising:
   a gas turbine comprising connected in series a compressor, at least one combustor and a turbine for producing shaft mechanical power and hot exhaust gases;
   a gas-to-air main heat exchanger comprising means for transferring heat from the gas turbine hot exhaust gases to at least one flow of compressed air to produce hot compressed air;
   a line connecting the gas side of the main heat exchanger with an exhaust duct of the gas turbine to supply the hot exhaust gases into the main heat exchanger;
   hot air turbine comprising means for producing work by expanding the hot compressed air;
   an additional air compressor comprising means for supplying at least one flow of compressed air into the main heat exchanger and for supplying at least two additional flows of compressed air;
   lines connecting the additional air compressor with the hot air turbine through an air side of the main heat exchanger to supply the hot compressed air to said turbine;
   an aftercooler comprising means for extracting heat from the first additional flow of compressed air;
   a cold air turbine comprising means for producing work and refrigerated air by expanding the first additional flow of compressed air;
   lines connecting the additional air compressor with the cold air turbine through the aftercooler to supply the first additional flow of compressed air to said turbine;
   lines connecting a suction duct of the compressor of the gas turbine with the atmosphere, with an exhaust duct of the cold air turbine, and with the additional air compressor to supply the gas turbine compressor with the atmospheric air, with the refrigerated air after the cold air turbine, and with the second additional flow of compressed air;
   a line connecting the exhaust duct of the cold air turbine with external consumers of the cold air;
   flow controlling &vices installed on the lines connected to the gas turbine compressor suction duct, to the cold air turbine inlet duct and to the external consumers of the cold air.

2. Gas Turbine With Bottoming Air Turbine Cycle according to claim 1, wherein the additional air compressor, the hot air turbine and the cold air turbine have a common shaft connected with consumer of shaft mechanical power to drive the additional air compressor and said consumer by said turbines.

3. Gas Turbine With Bottoming Air Turbine Cycle according to claim 1, wherein the gas side of the main heat exchanger has a bypass line with a flow controlling device.

4. Gas Turbine With Bottoming Air Turbine Cycle according to claim 1, wherein the cold air turbine has a bypass line with a flow controlling device.

5. Gas Turbine With Bottoming Air Turbine Cycle according to claim 1, wherein an auxiliary aftercooler is inserted in the line connecting the suction duct of the gas turbine compressor with the additional air compressor thereby increasing power output of the gas turbine.

6. Gas Turbine With Bottoming Air Turbine Cycle according to claim 1, wherein the main heat exchanger has two sections, their gas sides are connected in series, their air sides are separated and all of them are fed by the flow of compressed air from the additional air compressor thereby increasing quantity of heat transferred to the compressed air and power output of the hot air turbine.

7. Gas Turbine With Bottoming Air Turbine Cycle according to claim 1, comprising means for feeding the exhaust air of the hot air turbine into the gas side of the main heat exchanger thereby further increasing the quantity of heat transferred to the compressed air and power output of the hot air turbine.

8. Method of mechanical power production comprising the following steps:
   compressing a first air flow;
   heating this air flow;
   expanding this air flow with deriving work;
   extracting heat from this air flow;
   compressing a second air flow;
   heating this air flow by the heat extracted from the first air flow;
   expanding the second air flow with deriving work;
   compressing a third air flow using work derived while expanding took place;
   extracting heat and condensed water from this air flow;
   expanding this air flow with deriving work.

9. Method of power production according to claim 8, further comprising an additional heating of the second air flow by heat extracted from this air flow after its expanding.

10. Method of power production according to claim 8, wherein the third air flow after expanding extracts heat from the first air flow before its compressing.

11. Method of power production according to claim 8, further comprising an additional compressing of the first air flow using the work derived while the expanding the second and the third air flows took place.

* * * * *

UNITED STATES PATENT AND TRADEMARK OFFICE
CERTIFICATE OF CORRECTION

PATENT NO. : 5,442,904
DATED : August 22, 1995
INVENTOR(S) : Isaac Shnaid

It is certified that error appears in the above-indentified patent and that said Letters Patent is hereby corrected as shown below:

Title page, item [76], change "Zalman Shneuz Stz. 36/10" to --Zalman Shneur Str. 36/10--.

Signed and Sealed this

Fifth Day of December, 1995

Attest:

BRUCE LEHMAN

*Attesting Officer*      *Commissioner of Patents and Trademarks*